(12) United States Patent
Rashkovskiy et al.

(10) Patent No.: US 7,082,254 B1
(45) Date of Patent: Jul. 25, 2006

(54) ELECTRONIC PROGRAMMING GUIDE WITH NEW SEASON SERIES FEATURE

(75) Inventors: Oleg B. Rashkovskiy, Cupertino, CA (US); Ben S. Wymore, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 09/605,799

(22) Filed: Jun. 28, 2000

(51) Int. Cl.
*H04N 5/91* (2006.01)
(52) U.S. Cl. .............................. 386/83; 386/46; 725/58
(58) Field of Classification Search ................ 386/1, 386/83, 46; 725/39, 40, 42, 44–46, 51, 53, 725/58, 109, 110, 112
See application file for complete search history.

(56) References Cited

U.S. PATENT DOCUMENTS

| | | | | |
|---|---|---|---|---|
| 5,699,107 A | * | 12/1997 | Lawler et al. ................. | 725/58 |
| 6,020,880 A | * | 2/2000 | Naimpally .................... | 725/48 |
| 6,177,931 B1 | * | 1/2001 | Alexander et al. ............ | 725/52 |
| 6,324,338 B1 | * | 11/2001 | Wood et al. ................... | 386/83 |
| 6,487,722 B1 | * | 11/2002 | Okura et al. .................. | 725/40 |

* cited by examiner

*Primary Examiner*—James J. Groody
*Assistant Examiner*—Christopher Onuaku
(74) *Attorney, Agent, or Firm*—Steven D. Yates

(57) ABSTRACT

An electronic programming guide may enable the user to identify season premiere episodes. Moreover, using simple mouse click operations, the user may select a season series for automatic recording.

17 Claims, 5 Drawing Sheets

|  | Sat 04/29 ▼ | Now ▼ | All Categories ▼ | All Channels ▼ | OK |  |
|---|---|---|---|---|---|---|
| ← | 8:00 am | 8:30 am | 9:00 am | 9:30 am | 10:00 am | 10:30 am | → |
| ABC | Who Wants To Be A Millionaire | | Dharma & Greg | SportNight | NYPD Blue | | ABC |
| CBS | JAG | | 60 Minutes II | | Judging Amy | | CBS |
| FOX | That '70s Show | Malcolme & The Middle Rerun | Ally McBeal | | Local Programming | | FOX |
| NBC | Just Shoot Me Rerun | 3rd Rock From The Sun Rerun | Will & Grace | Victoria's Closet | Dateline NBC | | NBC |
| PBS | Nova Rerun | | The American Experience Rerun | | | Local Programming | PBS |
| UPN | I Dare You! The Ultimate Challenge Rerun | | The Parkers Rerun | | Local Programming | | UPN |
| WB | Buffy The Vampire Slayer | | Angel | | Local Programming | | WB |
| AMC | Lady In A Cage (1964) | | | Filmmakers | Brute Force (1947) *** (NR) | | AMC |
| ARTS | Law & Order | | Biography | | Investigative Reports | | ARTS |

| Season Premiers | Ongoing Series | Recommended |
|---|---|---|

Record Bar

FIG. 1

ELECTRONIC PROGRAMMING GUIDE WITH NEW SEASON SERIES FEATURE

BACKGROUND

This invention relates generally to electronic programming guides for facilitating the selection and recording of television programs.

Electronic programming guides may display a grid of television program times on one axis and channels or service providers on another axis. The grid may include particular programs listed by channel and time of presentation. The user can select any of the programs in the electronic programming guide for automatic viewing or recording. This may commonly be done by simply mouse clicking on the particular program listing to cause the program to be automatically tuned or automatically scheduled for recording or subsequent (future) viewing.

Television programs often run through a predefined series of shows called a season. A given television program may appear at a given time on a given day for a plurality of weeks. After the end of the season, a series of reruns of the previous programs may be broadcast. Thus, television program series generally have a season premiere and a season finale that constitute the first and last programs in a given series.

In many cases, users wish to determine when the season premiere will be broadcast since the users may have endured a extended period of reruns, conventionally over the summer. A user may wish to be sure to watch the premiere episode and to thereafter watch the program regularly until reruns start again.

Thus, there is a need for an electronic programming guide that facilitates the selection of season premieres and the capture of ensuing episodes.

BRIEF DESCRIPTION OF THE DRAWINGS

FIG. 1 is a graphical user interface in accordance with one embodiment of the present invention;

DETAILED DESCRIPTION

Figure 2:
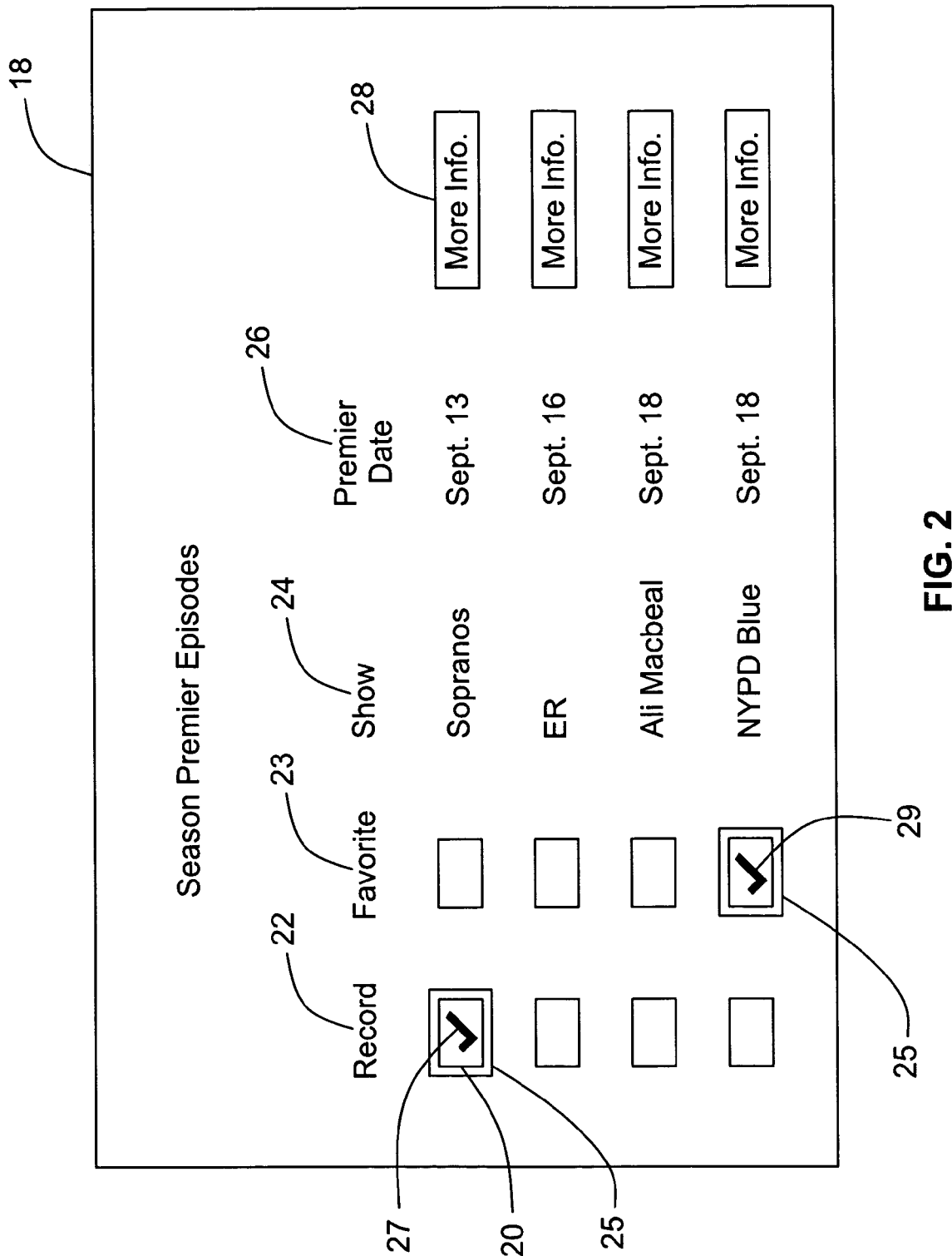
FIG. 2 is a graphical user interface in accordance with another embodiment of the present invention.

Referring to FIG. 1, an electronic programming guide graphical user interface 10 may include a series of program times corresponding to a current time and date and a series of channels or television service providers such as ABC, CBS, etc. A plurality of programs may be listed by time and service provider such as "Who Wants to be a Millionaire" listed from 8:00 to 9:00 a.m. on ABC.

Conventionally, the user may mouse select a given episode for viewing or recording. In addition, the user may mouse select a future episode to cause that episode to be automatically tuned in at its scheduled broadcast time.

The graphical user interface 10 includes a plurality of icons 12, 14 and 16. The icon 12 may be selected by the user to automatically display any upcoming season premieres. That is, if the user maneuvers the highlighting 13 over the icon 12 and then mouse clicks on the season premiere icon 12, the user is automatically provided information about all upcoming season premieres. Similarly, an ongoing series icon 14 may be provided and a recommended show icon 16 may be provided.

Each of the icons 12, 14 and 16 may be utilized to preferentially record a given series of programs. Thus, the icons 12, 14 and 16 may be associated with a record bar 11 of the graphical user interface 10. The user may mouse click on a given program and then the record bar 11 to record the program automatically in one embodiment.

Similarly, the user may select one of the icons 12, 14 or 16 to automatically record an entire season of television programs. In accordance with one embodiment of the present invention, when the user selects the season premiere icon 12, the graphical user interface 18, shown in FIG. 2, may be displayed in accordance with one embodiment of the present invention.

The interface 18 may provide a listing of all the upcoming television program season premiere episodes. In this hypothetical case, four premiere episodes are upcoming on the dates indicated at 26. Each episode 24 of the series may be scheduled for recording as indicated at 22 or for addition to the user's favorites list as indicated at 23. By mouse clicking on a block 20 that is highlighted, as indicated at 25, the user may cause a check mark 27 or 29 to appear to indicate the user's selection of a particular show 24 for either recording or addition to the user's favorites. Other selection systems may also be used.

When a program is selected for recording, not only is the premiere episode recorded, but all the episodes in the ongoing series may be automatically recorded. This is accomplished using software that is cognizant of (or is able to become cognizant of) the season schedule for the series through its finale.

The user can also mouse select the icon 28 to obtain more information about a given series. The additional information may include program times, channels, recommendations, preview clips, textual descriptions and rerun schedules, as examples.

Thus, in the embodiment illustrated in FIG. 2, the user has selected the Sopranos series for recording as indicated by the check mark 27 and NYPD Blue series for addition to the favorites as indicated by the check mark 29. Thus, all episodes of the upcoming series of Sopranos programs will be automatically recorded and all episodes of the NYPD Blue program are added to the user's favorites. The user's favorites may be indicated by highlighting on the electronic programming guide as the shows appear in one embodiment.

Figure 3:
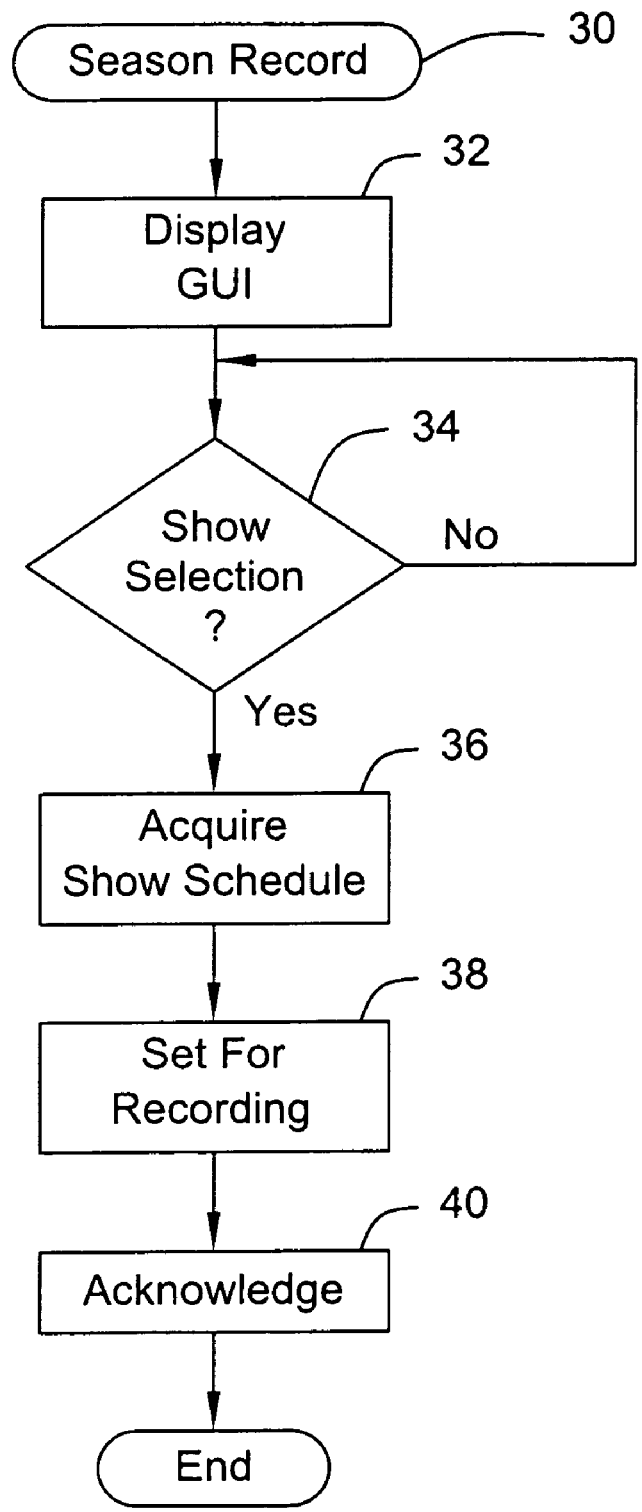
FIG. 3 is a flow chart for software in accordance with one embodiment of the present invention.

Referring to FIG. 3, in accordance with one embodiment of the present invention, the season record software 30 initially displays the graphical user interface 10, as indicated at block 32, and particularly provides the icon 12. If the user selects the season premiere icon 12, the software waits for a show selection (diamond 34) after displaying the graphical user interface 18. When a particular show is selected, for example by mouse clicking on the highlighted block 20, the show schedule may be acquired as indicated in block 36. The show schedule may be stored in a database associated with the software 30.

Alternatively, the season series schedule may be acquired through an Internet web site that is available for this purpose. Upon selection of the record feature, the Internet web site is automatically accessed and the program schedule automatically downloaded and stored in a database associated with software 30.

Each of the episodes is scheduled for automatic recording when broadcast on the indicated channel at the indicated time (block 38). Thereafter, the user may be given an acknowledgement on the user's display screen indicating that the season series has been scheduled for automatic recording (block 40).

Figure 4:
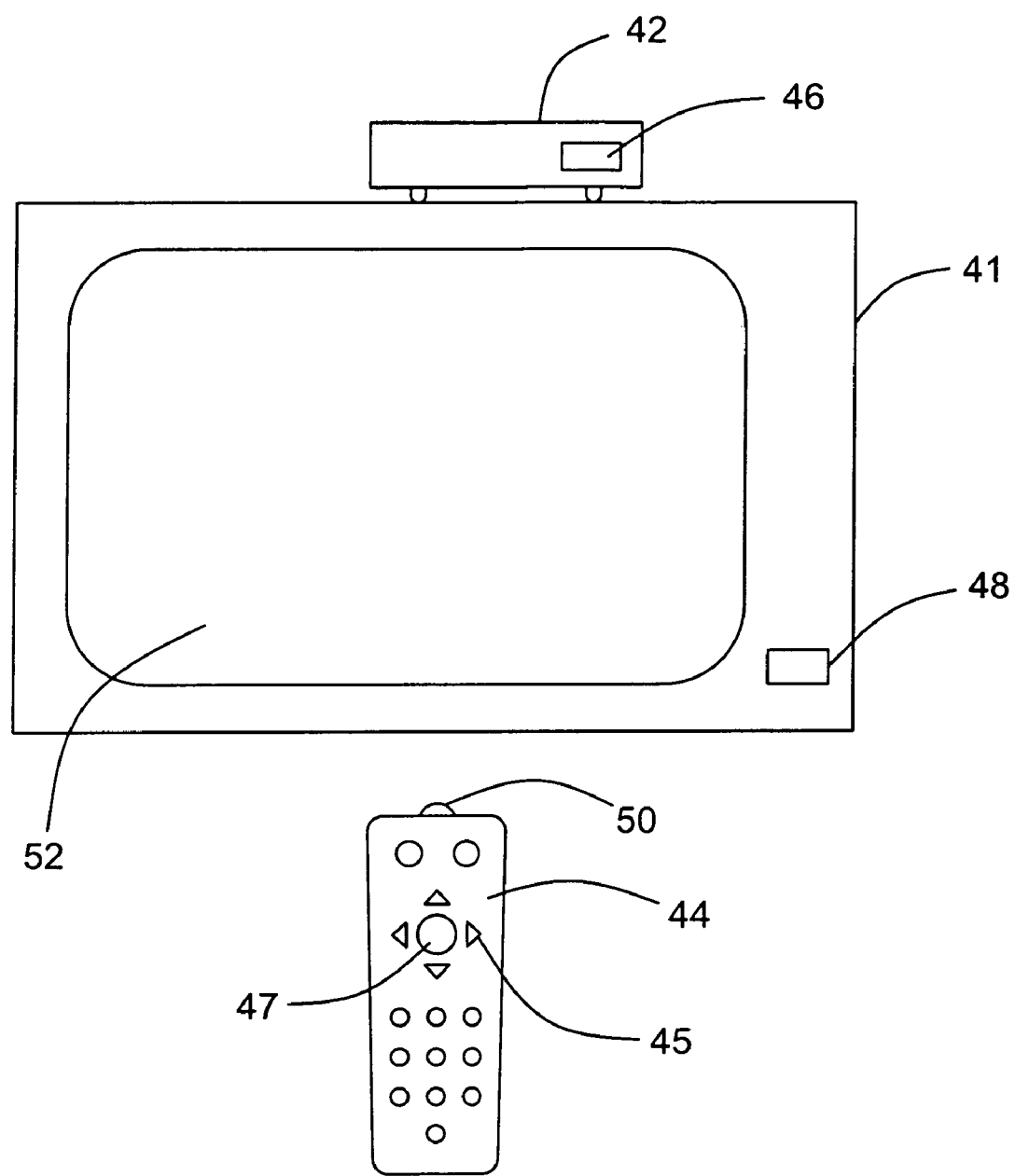
FIG. 4 is a front elevational view of a processor-based system in accordance with one embodiment of the present invention.

Referring to FIG. 4, in accordance with one embodiment of the present invention, the software 30 may be stored on a set-top box 42 that rests atop a television receiver 41 having a display screen 52. A remote control unit 44 interface 50 may control the television receiver 44, through its interface 48 and the set-top box 42, through its interface 46. The interfaces 50, 48 and 46 may be wireless interfaces such as infrared interfaces in accordance with one embodiment of the present invention.

A plurality of highlight navigation keys 45 and a select key 47 may be provided on the remote control unit 44 for selection of the various icons shown in the graphical user interfaces of FIG. 1 and FIG. 2. Particularly, the navigation keys 45 may be utilized to move the highlighting 13 or 25 to the desired entry that may be selected using the select button 47.

Figure 5:
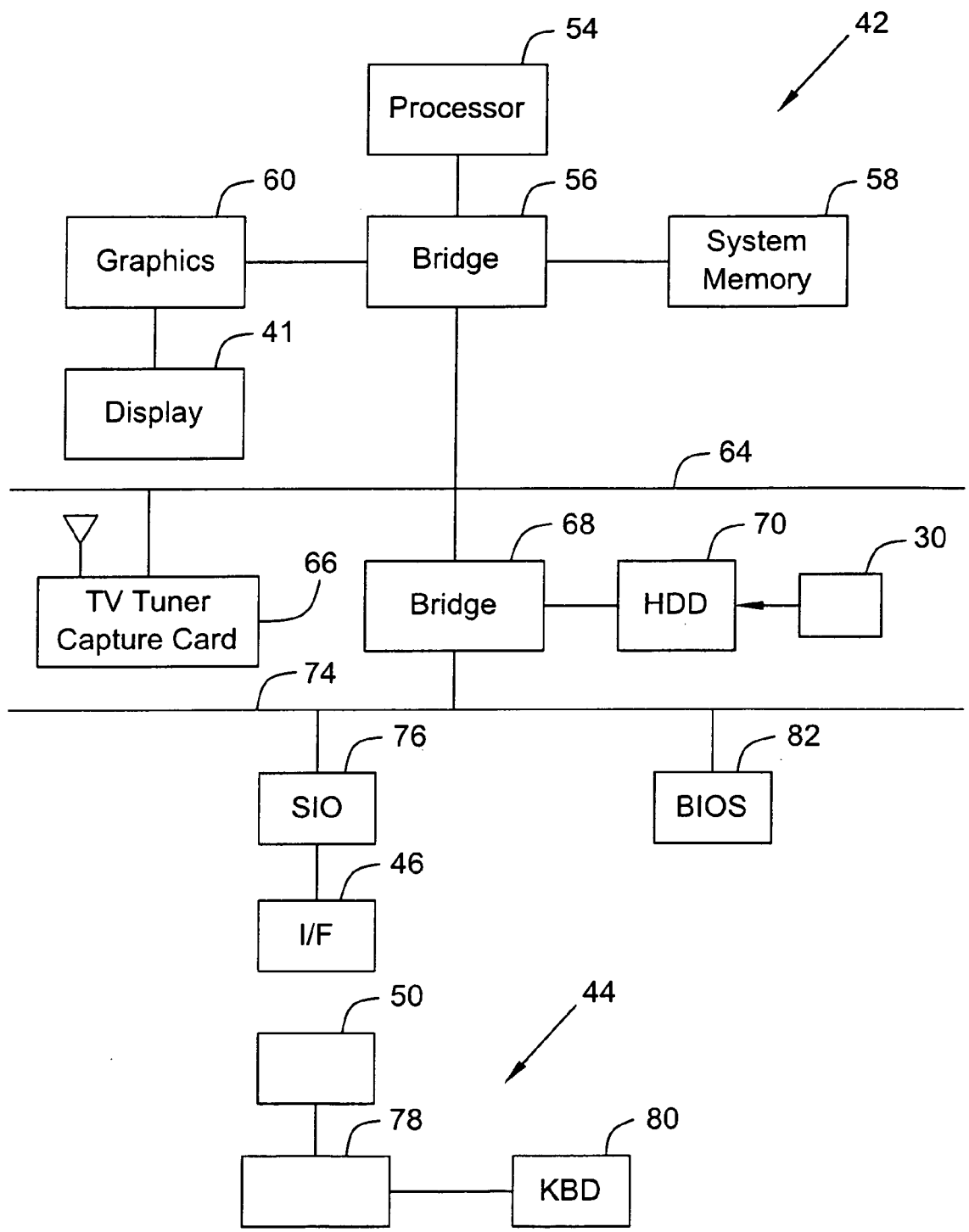
FIG. 5 is a block diagram of a processor-based system in accordance with one embodiment of the present invention.

Referring to FIG. 5, the set-top box 42 may include a processor 54 coupled to a bridge 56. The bridge 56 may couple a graphics accelerator 60 and a system memory 58. The graphics accelerator 60 may be coupled to the television receiver 41 in one embodiment of the present invention.

The bridge 56 may also couple to a bus 64 that may couple to a television tuner/capture card 66. The card 66 may be coupled to a video source such as a cable or satellite receiver as two examples. The bus 64 may also be coupled to a bridge 68. The bridge 68 may be coupled to a hard disk drive 70 that stores the software 30.

The bridge 68 may also be coupled to a bus 74. The bus 74 couples a serial input/output (SIO) device 76 and a basic input/output system (BIOS) storage 82. The device 76 in turn is coupled to the interface 46 that communicates with the remote control unit 44. Particularly, the remote control unit 44 may includes its own interface 50 coupled to a controller 78. The controller 78 receives input commands from a keypad 80.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    providing a graphical user interface indicating at least one season premiere episode corresponding to at least one upcoming season series of television programs; and
    in response to the selection of one or more season premiere episodes through said interface, determining a future schedule including at least new programs of the upcoming series, and automatically recording the season series in accordance with at least the future schedule.

2. The method of claim 1 wherein providing a graphical user interface includes providing an electronic programming guide.

3. The method of claim 1 including enabling the user to select the episode to automatically tune to all of the programs in the season series.

4. The method of claim 1 including storing information about the season series in a database.

5. The method of claim 1 including acquiring the future schedule over the Internet.

6. The method of claim 5 including, in response to the selection of the episode, automatically acquiring a schedule for said season series over the Internet.

7. An article comprising a medium storing instructions that enable a processor-based system to:
    provide a graphical user interface indicating at least one season premiere episode corresponding to at least one upcoming season series of television programs; and
    in response to the selection of one or more season premiere episodes through said interface, determining a future schedule including at least new programs of the upcoming series, and automatically recording the season series in accordance with at least the future schedule.

8. The article of claim 7 further storing instructions that enable the processor-based system to provide an electronic programming guide.

9. The article of claim 7 further storing instructions that enable the processor-based system to automatically tune to all of the programs in the season series.

10. The article of claim 7 further storing instructions that enable the processor-based system to obtain information about a season series from a database.

11. The article of claim 7 further storing instructions that enable the processor-based system to acquire information about a season series over the Internet.

12. The article of claim 11 further storing instructions that enable the processor-based system to automatically acquire a schedule of said season series over the Internet.

13. A system comprising:
    a processor;
    a storage coupled to said processor, said storage storing instructions that enable said processor to generate a graphical user interface to display a at least one upcoming season premiere episodes of television programs and, in response to the selection of the episode through said interface, determining a future schedule including at least new programs of the upcoming series, and automatically record the season series in accordance with at least the future schedule.

14. The system of claim 13 wherein said storage further stores instructions that enable the processor to generate an electronic programming guide.

15. The system of claim 13 including an interface coupled to said processor for wireless communications, said system further including a remote control unit that communicates with said interface.

16. The system of claim 13 wherein said storage further stores instructions that enable the processor to automatically tune to all of the programs in the season series.

17. The system of claim 13 wherein said storage further stores instructions that enable the processor to automatically acquire information about the season series over the Internet.

* * * * *